US012151258B2

(12) United States Patent
Haislet et al.

(10) Patent No.: US 12,151,258 B2
(45) Date of Patent: Nov. 26, 2024

(54) SPRAY GUN AND NOZZLE ASSEMBLY ATTACHMENT

(71) Applicant: 3M INNOVATIVE PROPERTIES COMPANY, St. Paul, MN (US)

(72) Inventors: Brady P. Haislet, Maple Plain, MN (US); Bryan J. Hayward, St. Paul, MN (US); Brian E. Duncan, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/232,596

(22) Filed: Aug. 10, 2023

(65) Prior Publication Data

US 2023/0381797 A1 Nov. 30, 2023

Related U.S. Application Data

(63) Continuation of application No. 17/551,459, filed on Dec. 15, 2021, now Pat. No. 11,766,686, which is a (Continued)

(51) Int. Cl.
*B05B 15/65* (2018.01)
*B05B 7/24* (2006.01)
*B05B 9/01* (2006.01)

(52) U.S. Cl.
CPC .................. *B05B 7/24* (2013.01); *B05B 9/01* (2013.01); *B05B 15/65* (2018.02)

(58) Field of Classification Search
CPC .. B05B 7/02; B05B 7/06; B05B 7/062; B05B 7/066; B05B 7/067; B05B 7/08;
(Continued)

(56) References Cited

U.S. PATENT DOCUMENTS 2,304,857 A * 12/1942 Stahl ..................... B05B 7/0815 239/300
5,609,302 A 3/1997 Smith
(Continued)

FOREIGN PATENT DOCUMENTS

EP 1340550 B1 10/2010
WO 2011062752 A2 5/2011
(Continued)

OTHER PUBLICATIONS

International Search Report for PCT International Application No. PCT/IB2017/057667, mailed on Mar. 26, 2018, 5 pages.

*Primary Examiner* — Darren W Gorman

(57) ABSTRACT

A liquid spray gun nozzle assembly is disclosed comprising a coating liquid inlet portion and a coating liquid outlet portion, and a coating liquid flow path connecting the coating liquid inlet with the coating liquid outlet. The spray gun connection portion opposite the coating liquid outlet portion is adapted to connect the liquid spray gun nozzle assembly to a compatible liquid spray gun body. The spray gun connection portion includes a liquid sealing member configured to facilitate provision of a liquid needle within a liquid needle zone and an air sealing member configured to isolate an air zone. The air sealing member includes a tapering rim. The liquid sealing member and the air sealing member are circular in shape.

20 Claims, 17 Drawing Sheets

Related U.S. Application Data continuation of application No. 16/466,712, filed as application No. PCT/IB2017/057667 on Dec. 5, 2017, now Pat. No. 11,229,921.

(60) Provisional application No. 62/430,383, filed on Dec. 6, 2016.

(58) Field of Classification Search
CPC ......... B05B 7/0815; B05B 7/083; B05B 7/24; B05B 7/2402; B05B 7/2408; B05B 7/2489; B05B 9/01; B05B 15/65
See application file for complete search history.

(56) References Cited

U.S. PATENT DOCUMENTS

| | | | | |
|---|---|---|---|---|
| 6,036,109 | A | 3/2000 | Deyoung | |
| 6,854,667 | B2 | 2/2005 | Ulrich et al. | |
| 6,860,438 | B1 | 3/2005 | Huang | |
| 6,971,590 | B2 * | 12/2005 | Blette | B05B 7/02 239/600 |
| 7,032,839 | B2 * | 4/2006 | Blette | B05B 7/083 239/290 |
| 7,296,759 | B2 | 11/2007 | Alexander et al. | |
| 7,354,074 | B2 | 4/2008 | Kosmyna et al. | |
| 9,192,950 | B2 | 11/2015 | Carleton et al. | |
| 9,381,533 | B2 | 7/2016 | Pellin et al. | |
| 10,870,120 | B2 | 12/2020 | Ruda | |
| 2003/0025000 | A1 | 2/2003 | Schmon et al. | |
| 2003/0042338 | A1 * | 3/2003 | Dankert | B05B 15/65 239/600 |
| 2003/0052190 | A1 | 3/2003 | Ulrich et al. | |
| 2004/0016825 | A1 | 1/2004 | Petrie et al. | |
| 2005/0145723 | A1 | 7/2005 | Blette et al. | |
| 2005/0242207 | A1 | 11/2005 | Tejeda | |
| 2006/0065761 | A1 | 3/2006 | Joseph et al. | |
| 2007/0262172 | A1 | 11/2007 | Huffman | |
| 2010/0187333 | A1 * | 7/2010 | Escoto, Jr. | B05B 12/002 239/290 |
| 2011/0121103 | A1 * | 5/2011 | Carleton | B05B 7/062 251/366 |
| 2013/0020414 | A1 | 1/2013 | Thomason et al. | |
| 2013/0092760 | A1 * | 4/2013 | Joseph | B05B 7/0861 29/428 |
| 2013/0221130 | A1 | 8/2013 | Joseph et al. | |
| 2013/0327850 | A1 * | 12/2013 | Joseph | B05B 7/083 164/47 |
| 2014/0246519 | A1 * | 9/2014 | Johnson | B05B 7/0815 239/422 |
| 2015/0028131 | A1 * | 1/2015 | Joseph | B05B 7/0815 239/318 |
| 2015/0069142 | A1 * | 3/2015 | Duncan | B05B 7/083 239/8 |
| 2015/0090614 | A1 | 4/2015 | Joseph et al. | |
| 2016/0052003 | A1 | 2/2016 | Escoto, Jr. et al. | |
| 2016/0059253 | A1 | 3/2016 | Gooden et al. | |
| 2016/0151797 | A1 | 6/2016 | Joseph et al. | |
| 2016/0175861 | A1 | 6/2016 | Gullicks et al. | |

FOREIGN PATENT DOCUMENTS

| | | | | |
|---|---|---|---|---|
| WO | WO-2015053959 | A1 * | 4/2015 | B05B 1/30 |
| WO | 2015191323 | A1 | 12/2015 | |
| WO | 2016191240 | A1 | 12/2016 | |
| WO | 2017123707 | A1 | 7/2017 | |
| WO | 2017123714 | A1 | 7/2017 | |
| WO | 2017123715 | A1 | 7/2017 | |
| WO | 2017123718 | A1 | 7/2017 | |
| WO | 2018104826 | A1 | 6/2018 | |
| WO | 2018104871 | A1 | 6/2018 | |

* cited by examiner

SPRAY GUN AND NOZZLE ASSEMBLY ATTACHMENT

CROSS REFERENCE TO RELATED APPLICATIONS

This application is a continuation of U.S. application Ser. No. 17/551,459, filed Dec. 15, 2021, which is a continuation of U.S. application Ser. No. 16/466,712, filed Jun. 5, 2019, now pending, which is a national stage filing under 35 U.S.C. 371 of PCT/IB2017/057667, filed Dec. 5, 2017, which claims the benefit of U.S. Application No. 62/430,383, filed Dec. 6, 2016, the disclosure of which is incorporated by reference in its/their entirety herein.

BACKGROUND

Spray guns are known for the application of coatings to various substrates. It has been known to provide spray guns with removable nozzle assemblies to facilitate easier cleaning of wetted parts and to allow for exchanging nozzles of differing types for different applications. There is a need for improved connections between removable nozzle assemblies and spray gun bodies.

SUMMARY OF THE INVENTION

Exemplary embodiments according to the present disclosure include, but are not limited to, the embodiments listed below, which may or may not be numbered for convenience. Several additional embodiments, not specifically enumerated in this section, are disclosed within the accompanying detailed description.

A liquid spray gun nozzle assembly is disclosed comprising a coating liquid inlet portion and a coating liquid outlet portion, and a coating liquid flow path connecting the coating liquid inlet with the coating liquid outlet. The spray gun connection portion opposite the coating liquid outlet portion is adapted to connect the liquid spray gun nozzle assembly to a compatible liquid spray gun body. The spray gun connection portion includes a liquid sealing member configured to facilitate provision of a liquid needle within a liquid needle zone and an air sealing member configured to isolate an air zone. The air sealing member includes a tapering rim. The liquid sealing member and the air sealing member are circular in shape.

The words "preferred" and "preferably" refer to embodiments described herein that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the terms "comprises" and variations thereof do not have a limiting meaning where these terms appear in the accompanying description. Moreover, "a," "an," "the," "at least one," and "one or more" are used interchangeably herein.

Relative terms such as left, right, forward, rearward, top, bottom, side, upper, lower, horizontal, vertical, and the like may be used herein and, if so, are from the perspective observed in the particular figure. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The above summary is not intended to describe each embodiment or every implementation of the reservoirs and associated vent assemblies described herein. Rather, a more complete understanding of the invention will become apparent and appreciated by reference to the following Description of Illustrative Embodiments and claims in view of the accompanying figures of the drawing.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

Figure 1:
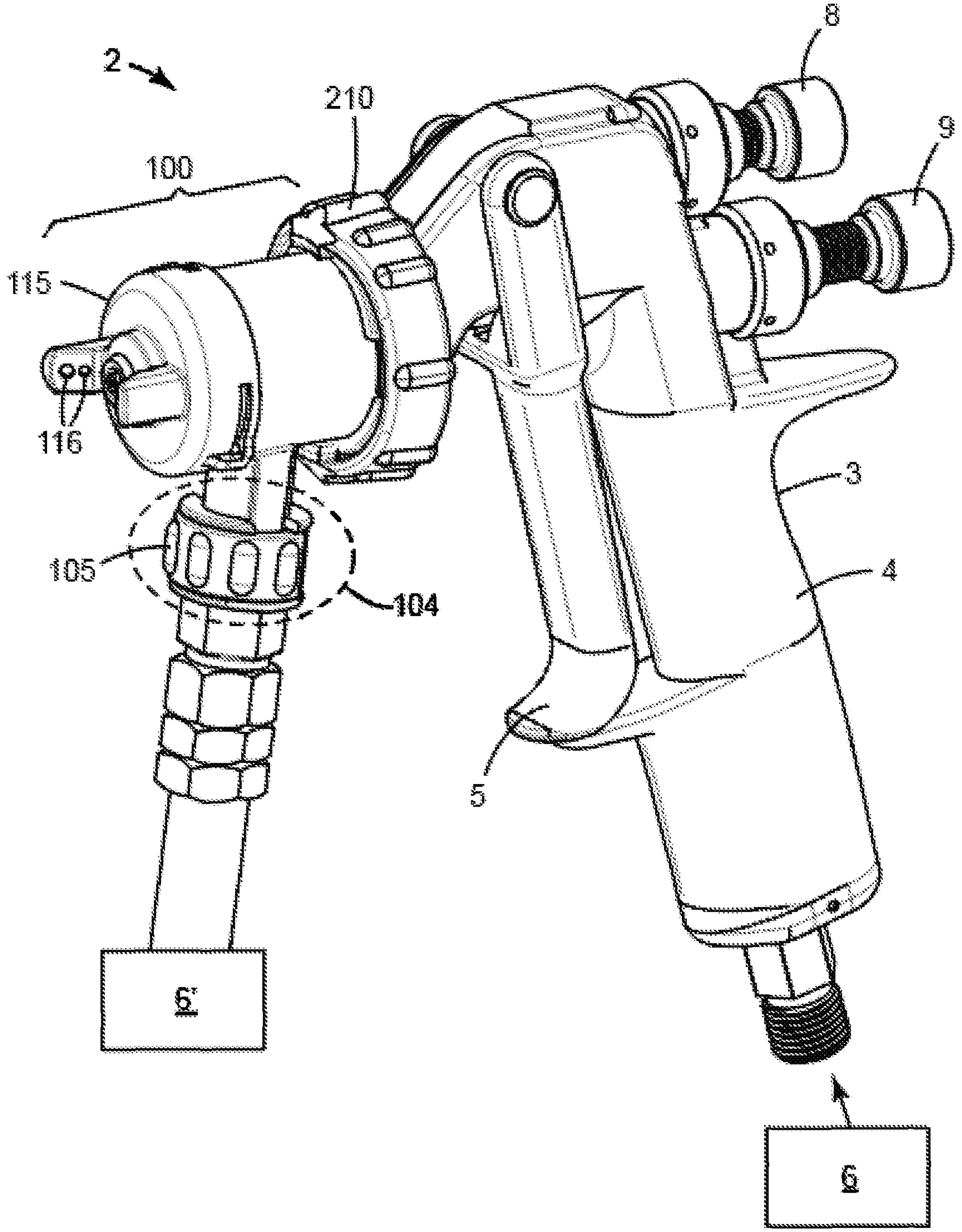
FIGS. 1-3 depict exemplary liquid spray guns according to the present disclosure.
Figure 2:
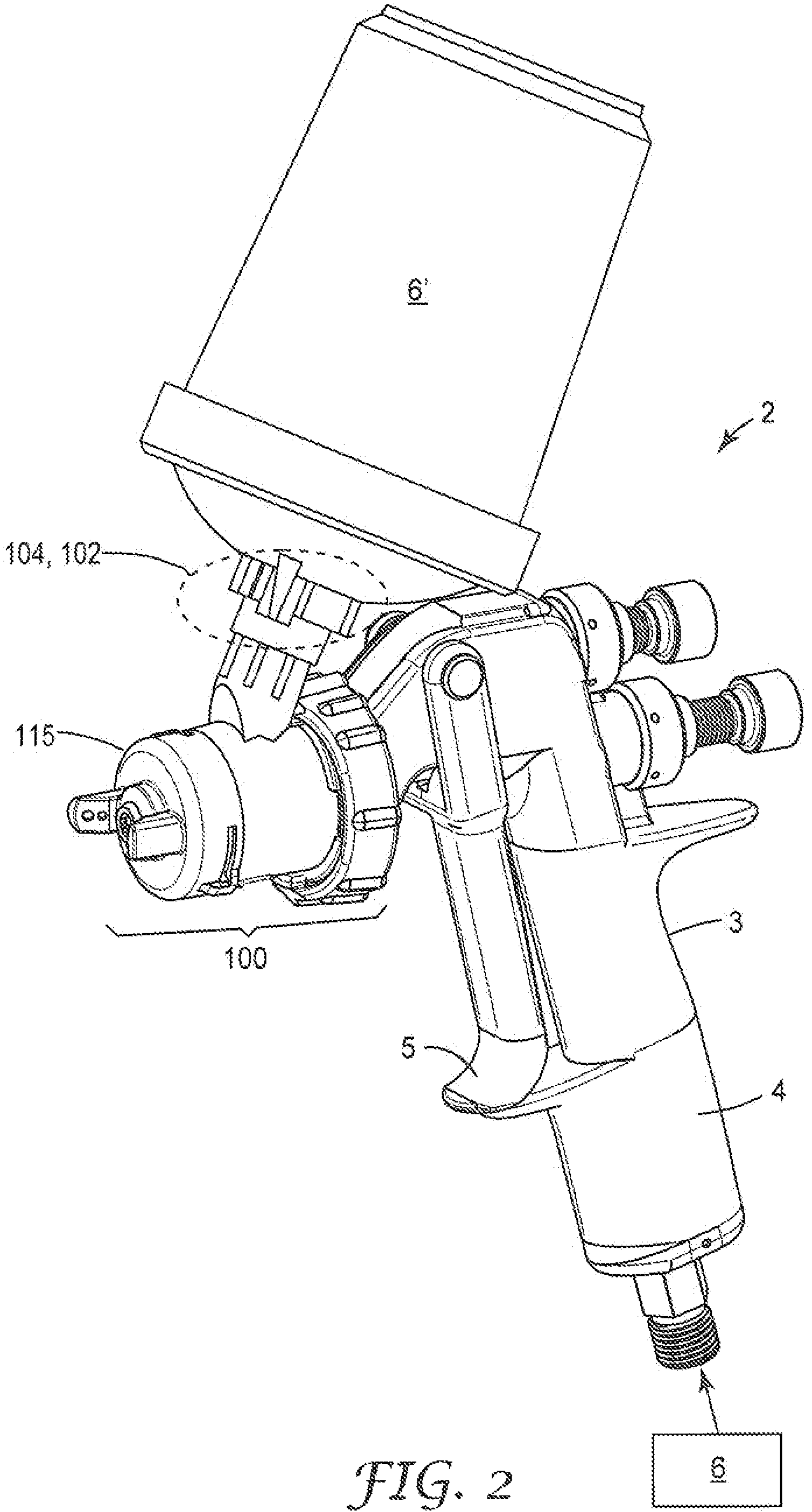
Figure 3:
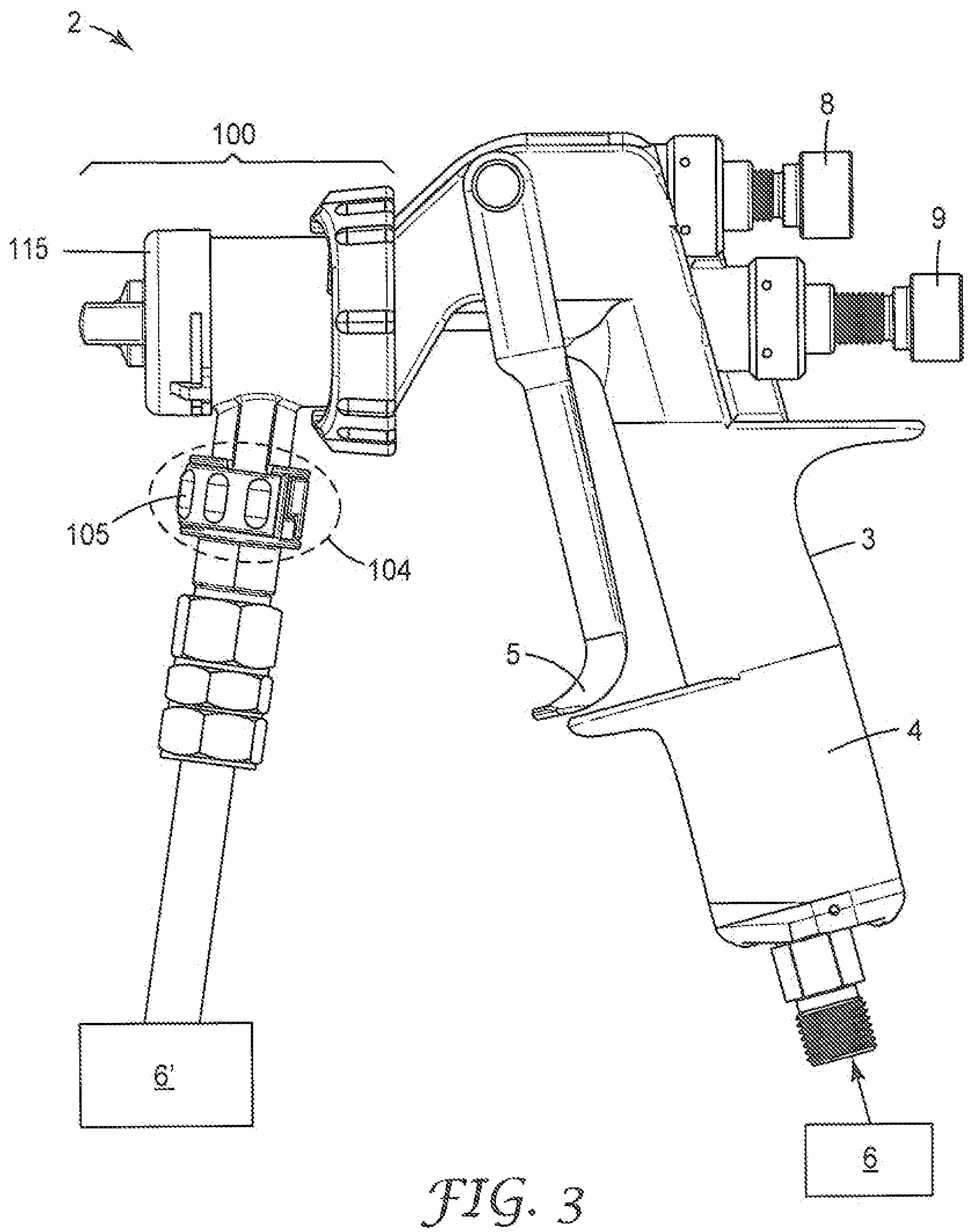

Referring to FIGS. 1 through 3, various exemplary embodiments of a liquid spray gun 2 are shown. The liquid spray gun 2 comprises a handle 4, a trigger 5, a connection for an external pressure source 6, a liquid spray gun body 3, a liquid needle adjustment knob 9, a shaping air control knob 8, and a liquid spray gun nozzle assembly 100. The liquid spray gun nozzle assembly 100 comprises a spray gun connection portion 120 that is removable and attachable at a nozzle assembly connection portion 200 on the spray gun body 3.

The liquid spray gun nozzle assembly 100 comprises one end of a liquid spray gun coating liquid connector 104 (located at a coating liquid inlet portion 102), through which a coating liquid is supplied to the liquid spray gun 2 from an external liquid source 6'. As shown, for example, in FIGS. 1 and 3, the liquid connector 104 comprises a quick-connect coupler 105. Such a quick-connect coupler is described, for example, in U.S. Provisional patent application No. 62/430,388, filed Dec. 6, 2016, entitled "Paint Spray Gun Coating Liquid Connector," the disclosure of which is herein incorporated by reference in its entirety. Other liquid connectors are possible. For example, the liquid connector 104 may comprise connections, or features of connections, described in WO2017/123707; WO2017/123714; WO2017/123715; WO2017/123718; and/or in U.S. Pat. Pub. Nos. 2013/0221130 A1 ("Spraygun with built-in quick-fit connector"); 2004/0016825 A1 ("Mixing cup adapting assembly"); 2015/0090614 A1 ("Apparatus for spraying liquids, and adapters and liquid reservoirs suitable for use therewith"); 2006/0065761 A1 ("Easy clean spray gun"); 2016/0052003 A1 ("Liquid Spray gun, spray gun platform, and spray head assembly"); and/or 2015/0028131 ("Spray gun having internal boost passageway"), the disclosures of which are hereby incorporated by reference in their entireties. In particular, the liquid connector 104 may comprise a gravity-fed spray gun paint reservoir connector, an example of which is shown in FIG. 2.

Figure 19:
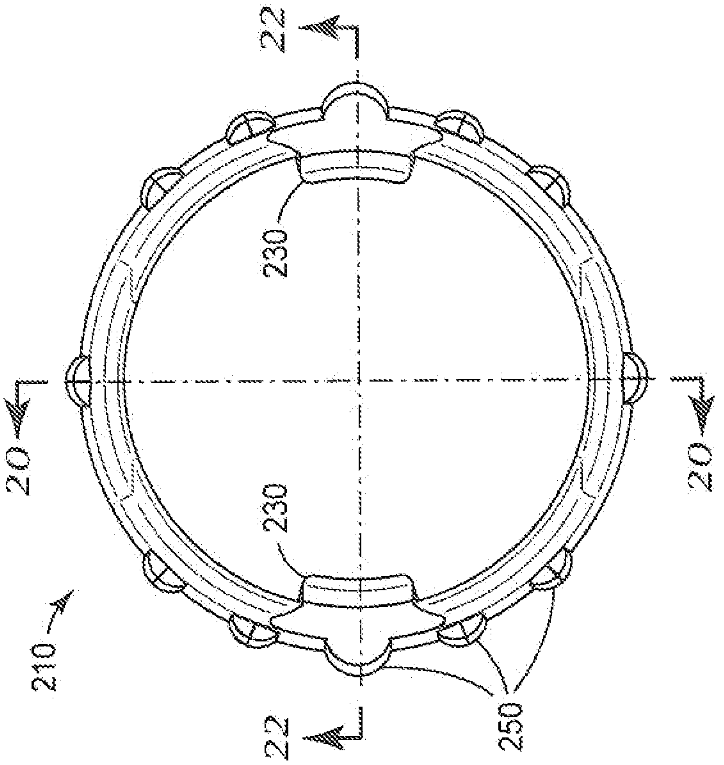
FIGS. 18 and 19 depict exemplary locking rings according to the present disclosure.

Within the liquid spray gun nozzle assembly 100 is a coating liquid flow path 110 through which the coating liquid flows from the liquid spray gun coating liquid connector 104 to a liquid nozzle 108 (see, e.g., FIG. 19). In operation, the coating liquid passes from the coating liquid inlet portion 102, along the coating liquid flow path 110, along a spray axis 101 parallel to a liquid needle 9', and ultimately is expelled from the liquid nozzle 108 upon depressing the trigger 5. When the spray gun is idle (i.e., not spraying), the liquid needle 9' typically occludes the liquid nozzle 108. The liquid needle is sealed by one or more liquid needle sealing elements 111 towards the rearward end of the coating liquid flow path 110 (as seen, for example, in FIG. 17, wherein the liquid needle 109 is not shown as the exemplary liquid spray gun nozzle assembly 100 is shown in a detached state). When the trigger 5 is depressed, the liquid needle 9' is withdrawn from the liquid nozzle 108, thereby allowing the coating liquid to pass through. At the same time, depressing the trigger activates the pressurized air supply to assist in (depending on the gun type) urging coating liquid through and/or from the liquid nozzle 108, atomizing the coating liquid, or shaping the coating liquid (e.g., via the air cap 115, described below). The travel of liquid needle 9' and the total air flow through the gun is adjusted via the liquid needle adjustment control 9. In the embodiment shown, the relative volume of air-flow among the air cap 115 (for shaping purposes) and a center air outlet 107 (for atomization purposes) is controlled via an air adjustment control 8. The forward end of the nozzle body 100' comprises a nozzle plate 108' which comprises the liquid nozzle 108 along with air guiding apparatus to guide shaping air and atomization air to the shaping air zone 176 and the center air zone 180 (described elsewhere) in the assembled air cap 115. In the embodiments shown, the nozzle plate 108' is optionally provided as a separate part that is sealingly secured to the nozzle body 100' by means of an adhesive, welding, or the like. In other embodiments, the nozzle plate 108' is integral with the nozzle body 100'.

In some embodiments, the liquid spray nozzle assembly comprises an air cap 115 affixed to the spraying end thereof. When provided, an air cap 115 can direct pressurized air advantageously toward the stream of coating liquid, e.g., via one or more shaping air outlets 116 located in one or more air horns 117, as it is expelled from the liquid nozzle 108 to assist in atomization of the coating liquid and shaping of the coating liquid jet into the desired spray pattern for a given application. Within the air cap or proximate the air cap, the center air outlet 107 directs air around the liquid outlet 108 to draw the coating liquid from the liquid nozzle 108 and (if desired) also impinges upon the coating liquid to atomize it, creating a fine mist of droplets. Optionally, one or more auxiliary air outlets 118 may be provided in the air cap 115 to further assist in shaping the spray pattern. The air cap 115, the center air outlet 107, the liquid nozzle 108, the air horns 117, the auxiliary air outlets 118, and the shaping air outlets 116 may be configured as described in U.S. provisional patent application No. 62/430,393, entitled "Spray Gun Air Cap Retention Means," filed on Dec. 6, 2016, and/or in U.S. Pat. Pub. Nos. 2016/0052003 A1 ("Liquid Spray gun, spray gun platform, and spray head assembly"); 2013/0327850 A1 ("Nozzle tips and spray head assemblies for liquid spray guns"); 2014/0246519 A1 ("Spray head assembly with integrated air cap/nozzle for a liquid spray gun"); 2013/0092760 A1 ("Spray head assemblies for liquid spray guns"); 2015/0069142 A1 ("Spray gun barrel with inseparable nozzle"); 2016/0151797 A1 ("Air caps with face geometry inserts for liquid spray guns"); 2016/0175861 A1 ("Nozzle assemblies, systems and related methods"); and/or in WO2015/191323); and/or WO2016/191240), the disclosures of which are hereby incorporated by reference in their entireties. In the embodiments shown, the coating liquid is contained entirely within the liquid spray gun nozzle assembly 100, thus generally avoiding the need to clean the liquid spray gun body 3 after use.

The external liquid source 6' may be a container that is directly affixed to the liquid spray gun nozzle assembly 100 (see, e.g., FIG. 2), or may comprise a remote reservoir that is connected to the liquid spray gun nozzle assembly 100 by way of a hose. In some embodiments, the external liquid source is remotely pressurized (via a pressurized canister, a remote pump, or the like) to force the coating liquid into the liquid spray gun nozzle assembly 100. In other embodiments, the coating liquid may be forced or pulled into the liquid spray gun nozzle assembly 100 under the force of gravity (again, see FIG. 2), by way of a negative pressure induced by a venturi at the liquid nozzle 108, by a local pump, or through a combination of the above. Because the external liquid source can vary as described, it is shown in schematic form in FIGS. 1 and 3.

Figure 4:
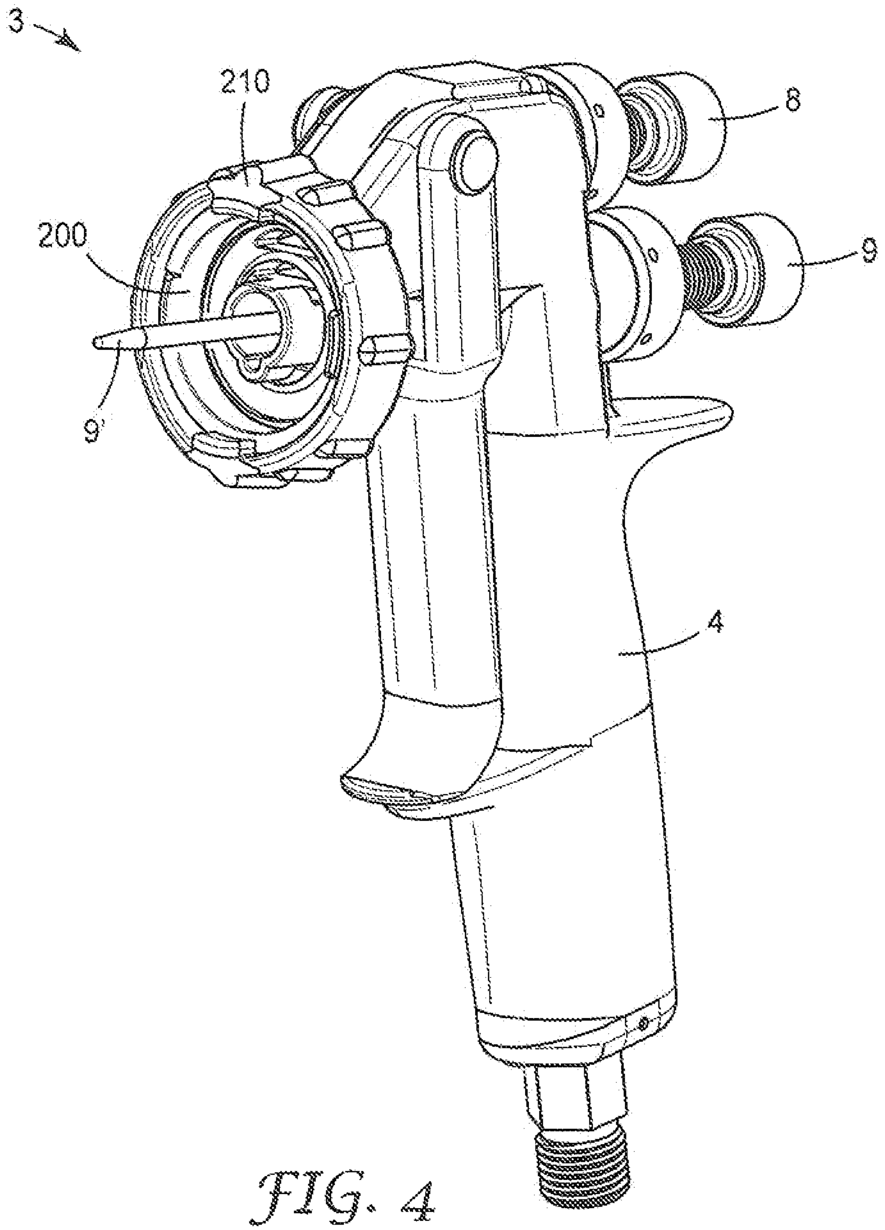
FIGS. 4 and 5 depict exemplary liquid spray guns wherein a liquid spray gun nozzle assembly has been removed.
Figure 5:
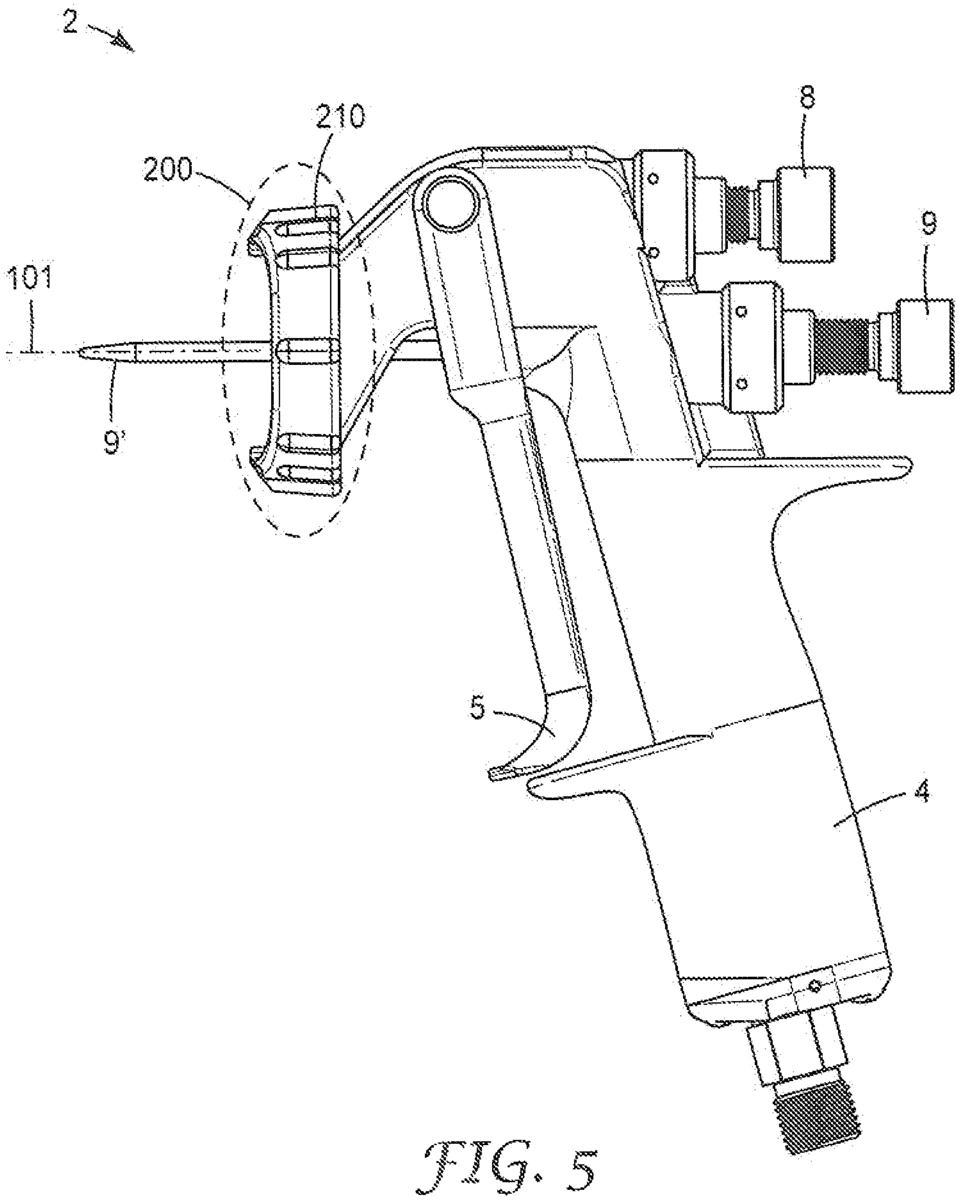

As shown in FIGS. 4 and 5, a liquid needle 9' is affixed to the liquid spray gun body 3, such that cleaning of the liquid spray gun body 3 is generally limited to wiping or otherwise clearing the tip of the liquid needle after detaching the liquid spray gun nozzle assembly 100. In other embodiments, the liquid needle may be housed in the liquid spray gun nozzle assembly 100 such that it is removable from the liquid spray gun body 3 along with the liquid spray gun nozzle assembly 100. In either case, the liquid spray gun nozzle assembly 100, if disposable, may be discarded after use such that no further cleanup is required. Alternatively, the liquid spray gun nozzle assembly 100, if reusable, is the only portion of the liquid spray gun 2 left to clean. Both configurations can result in reduced cleanup time and materials, such as solvents, compared to what is typically required in a conventional spray gun.

Figure 6:
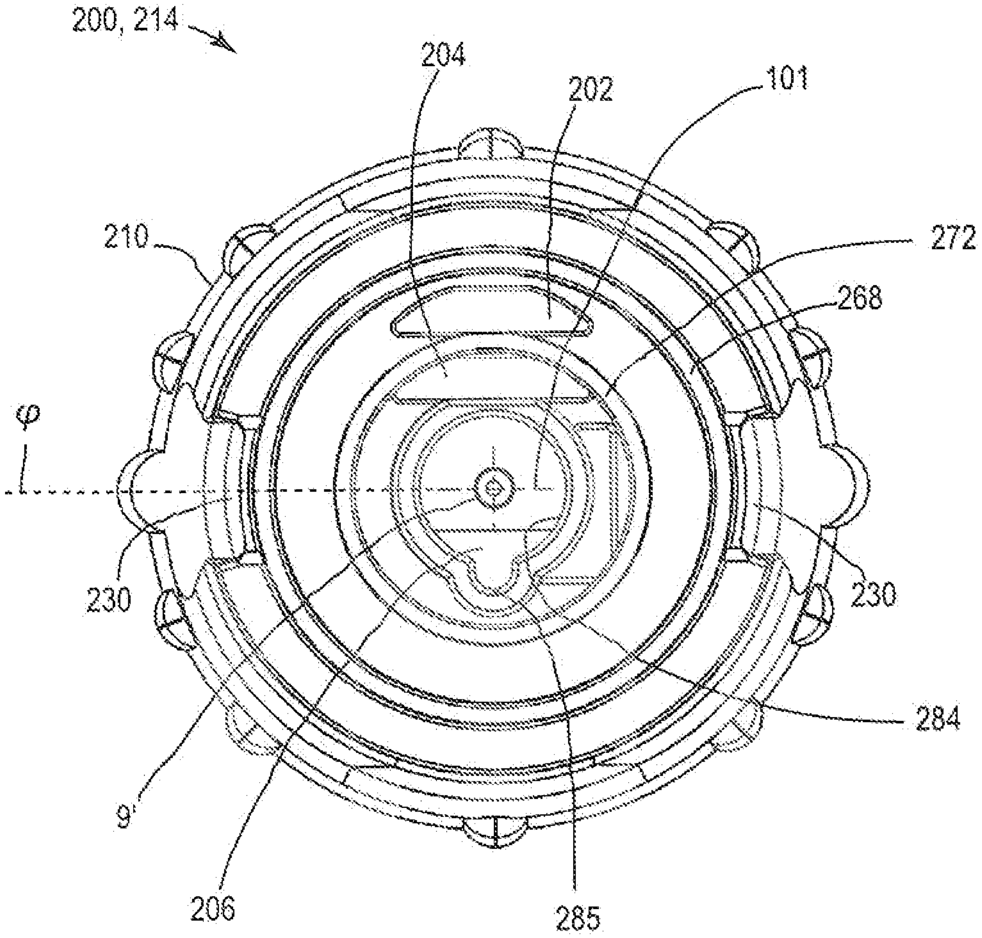
FIG. 6 depicts a nozzle assembly connection portion in an assembly position.

The exemplary nozzle assembly connection portion 200 facilitates the attachment of the liquid spray gun nozzle assembly 100 to the liquid spray gun body 3 by way of a captured, rotatable locking ring 210, as seen in FIGS. 4-6. FIG. 6 shows the nozzle assembly connection portion 200 as viewed along the spray axis 101. As shown, there is a shaping air port 202 and a center air port 204, through which shaping air and center air are respectively supplied to the liquid spray gun nozzle assembly 100. Also provided is a liquid needle port 206 within which the liquid needle 9' resides. A corresponding view of the spray gun connection portion 120 of a liquid spray gun nozzle assembly 100 is shown in FIG. 13.

Figure 13:
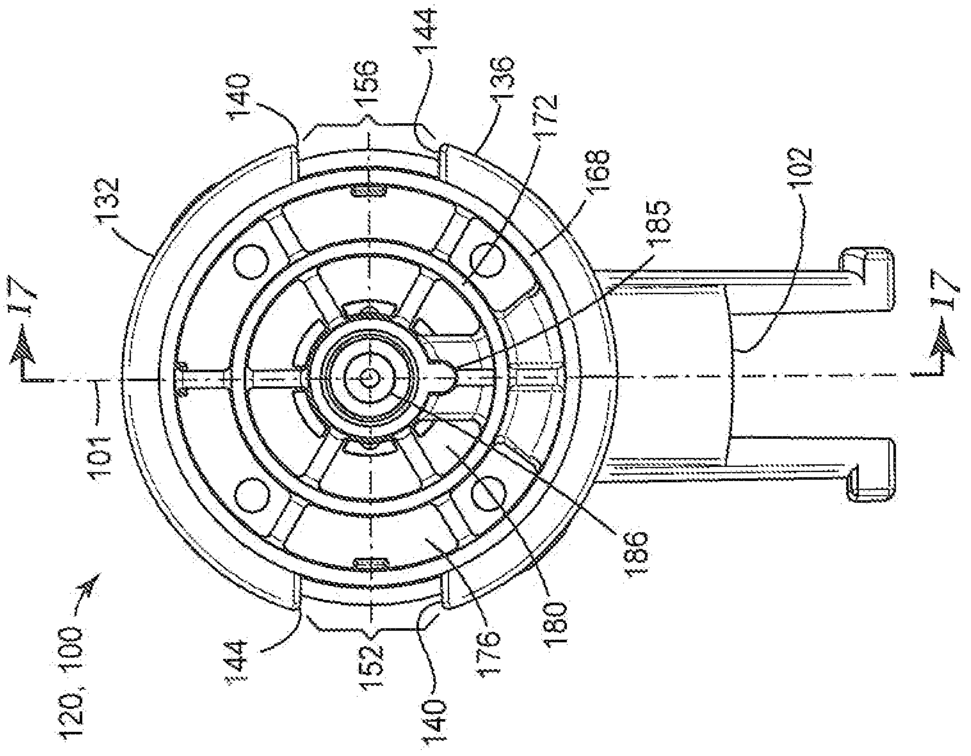

Referring now to the interaction between the nozzle assembly connection portion 200 and the spray gun connection portion 120, further reference is made to FIGS. 6 and 13. When the liquid spray gun nozzle assembly 100 is attached to the nozzle assembly connection portion 200, various sealing features interact to isolate various zones, thereby allowing for appropriate control of air flow. For example, interactions are made in accordance with the following table:

TABLE 1

| On Spray Gun Connection Portion 120 of Liquid Spray Gun Nozzle Assembly 100 | On Nozzle Assembly Connection Portion 200 of Liquid Spray Gun 2 |
|---|---|
| First sealing member 168 → | ← First sealing seat 268 |
| Second sealing member 172 → | ← Second sealing seat 272 |
| Third sealing member 184 → | ← Third sealing seat 284 |

Provision of the aforementioned seals allows for isolation of a shaping air zone 176, a center air zone 180, and a liquid needle zone 186. In other words, after connection and sealing, the shaping air port 202 supplies air to the shaping air zone 176, the center air port 204 supplies air to the center air zone 180, and the liquid needle port 206 facilitates provision of the liquid needle 9' in the liquid needle zone 186. It should be understood that the third sealing member 184 and third sealing seat 284 are optional, since sealing (e.g., a packing (not shown)) around the liquid needle 9' is typically already provided and thus coating liquid and compressed air are already fluidly isolated without the need of an additional seal against air in the center air zone. In such cases, there may still be a corresponding structure as shown at 184 (see, e.g., FIG. 17), but it need not achieve a sealing function.

In some embodiments, the first sealing member 168 and second sealing member 172 are essentially concentric. In some embodiments, the second sealing member 172 and third sealing member 184 are essentially concentric. In some embodiments, the first sealing member 168 and third sealing member 184 are essentially concentric. In some embodiments, the first sealing member 168, the second sealing member 172, and the third sealing member 184 are essentially concentric. "Essentially concentric," as used herein, means that the described features surround a and share a common axis (e.g., the spray axis 101) and are circular in shape, with allowances for irregularities in the circular shape(s). An example of an irregularity within the scope of the above definition is the nozzle alignment feature 185, which corresponds to the gun alignment feature 285 in the nozzle assembly connection portion 200. Such an irregularity can assist in enhancing rotational alignment of the spray gun nozzle assembly 100 with respect to a spray gun body 3.

In one embodiment, the respective sealing member(s) and sealing seat(s) provide a sealing function by way of a resiliently compressible material such as a gasket. Such a gasket may be provided as a separate part on either or both components that is attached by for example, snapping or adhesive. Alternatively, the gasket may be overmolded or insert molded onto (or within) one or both components.

Figure 17:
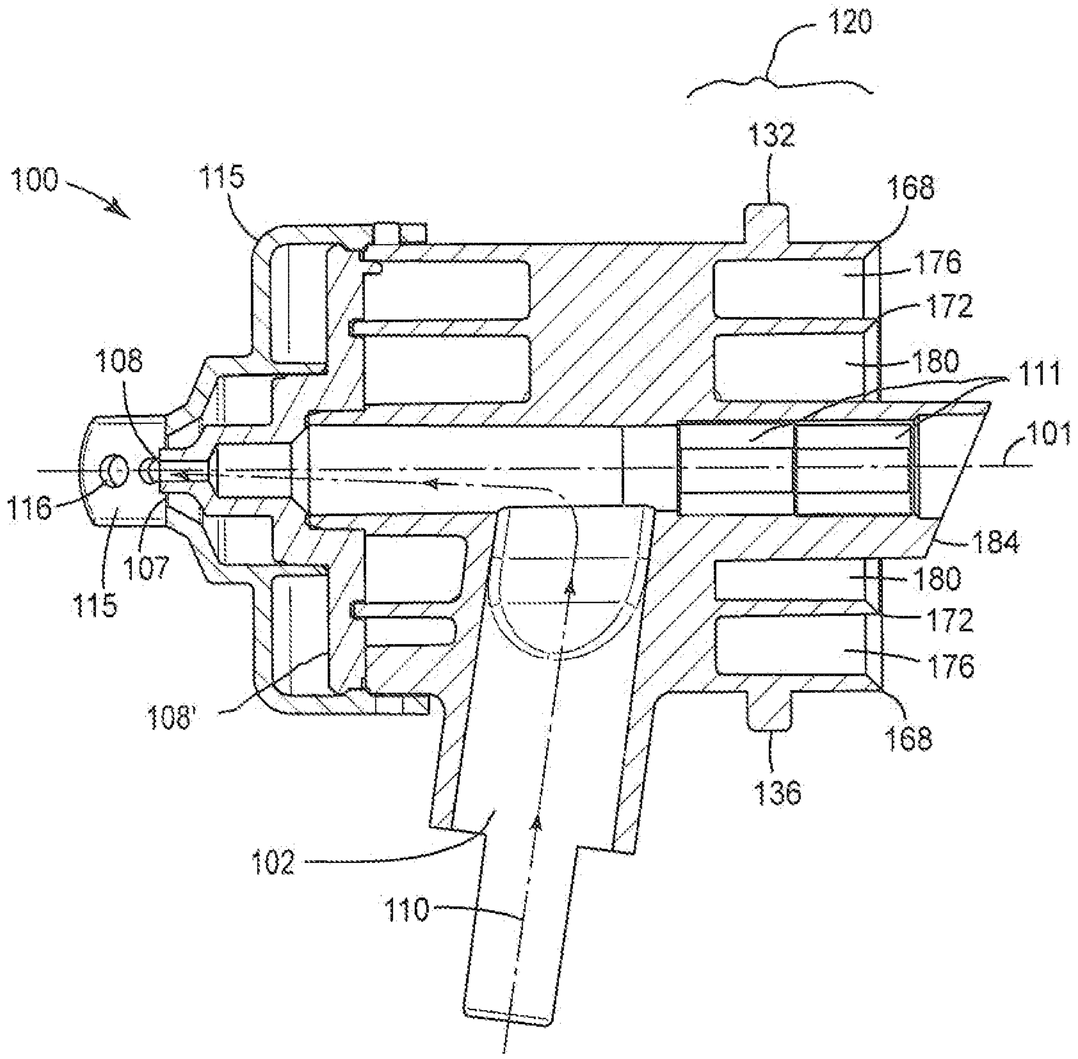
FIG. 17 is a cross-section view of a spray gun nozzle assembly taken at 17-17 of FIG. 13.

In yet another embodiment, the sealing function is provided by deformation of one or more of the components themselves. In such embodiments, the relative geometry and materials of the liquid spray gun nozzle assembly 100 and the nozzle assembly connection portion 200 are chosen to interact to create a seal without the provision of separate components or special gasketing materials. For example, as can be seen in FIG. 17, the first and second sealing member 168 and 172 are provided as tapering rims that terminate in a pointed profile. These pointed profiles interact with the corresponding first and second sealing seats 268 and 272 such that either (depending on the relative hardness of the materials chosen) (i) the pointed profiles are slightly "crumpled" to form a seal; or (ii) the pointed profiles slightly bite or dig into the sealing seat(s). In some embodiments, both crumpling and digging occur in concert. In embodiments described by the paragraph, components can be simplified and manufactured in a less costly manner due to elimination of the need for additional sealing materials or parts. Although the tapering rims are shown in FIG. 17 as having a single tapering surface terminating at an apex, they could alternatively be constructed with two tapering surfaces meeting at an apex, etc.

In some embodiments, the sealing seats are provided as blind recessed receiving ports into which the sealing members can slide a distance prior to becoming fully seated against a blind end of the seat. In such embodiments, friction alone may provide sufficient sealing, or may be aided or solely provided by crumpling and/or digging as described above, or by sealing or gasketing materials as described above.

Regardless of the nature of the particular seal chosen, seals can be provided as a sliding seal (e.g., a piston-type seal) (see the interaction of the third sealing member 184 with the third sealing seat 284 depicted in FIGS. 6 and 17), a face seal (see the interaction between the first and second sealing members 168 and 172 with the first and second sealing seats 268 and 272 depicted in FIGS. 6 and 17), or combinations thereof.

Figure 18:
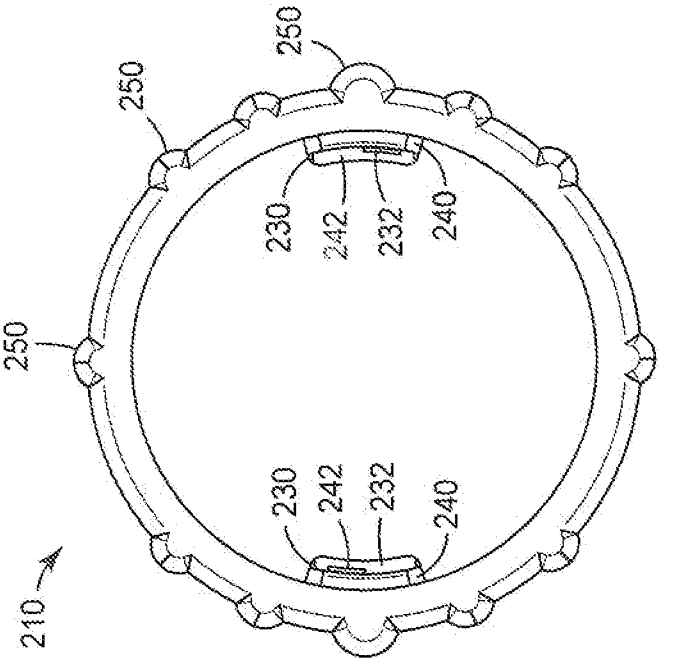
Figure 22:
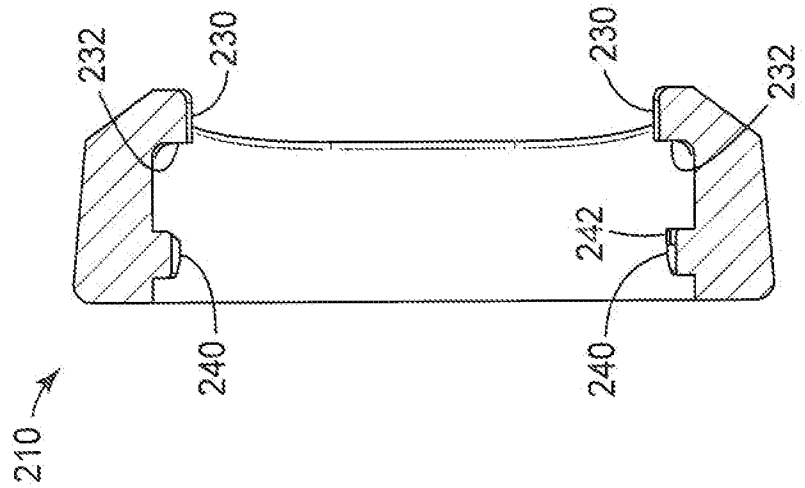
FIG. 22 is a cross-section view of a locking ring taken at 22-22 of FIG. 19.
Figure 21:
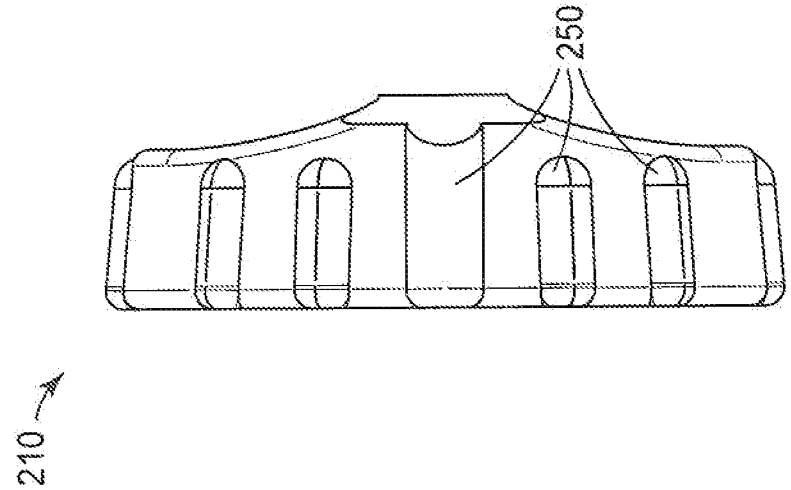
FIG. 21 depicts a locking ring according to the present disclosure.
Figure 20:
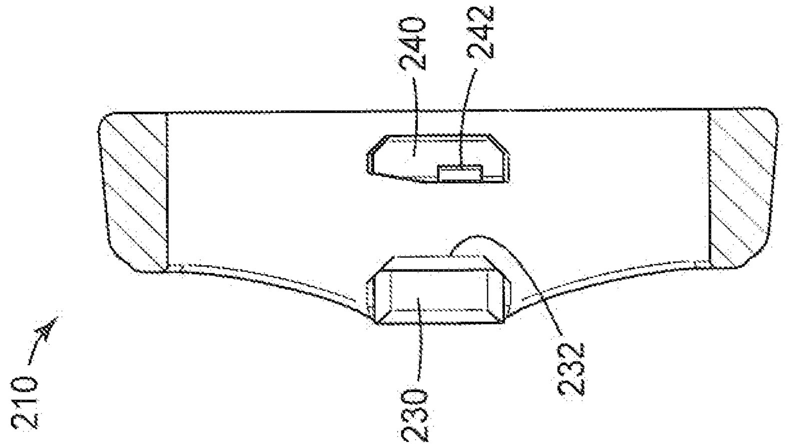
FIG. 20 is a cross-section view of a locking ring taken at 20-20 of FIG. 19.

As seen in FIGS. 18-20, the locking ring 210 comprises one or more camming lugs 230. As shown in the depicted embodiments, two camming lugs 230 are positioned opposite one another, spaced equidistantly about the circumference of the locking ring 210. Each camming lug 230 comprises a lug camming surface 232 positioned to interact with a camming surface 148 on a camming member (132, 136) located on the liquid spray gun nozzle assembly 100.

As shown in FIGS. 18 and 20, the locking ring 210 further comprises one or more guide features 240 to facilitate retention of the locking ring 210 on the spray gun body 3, and to guide controlled rotation of the locking ring. A guide member may optionally further comprise one or more snap features 242 that facilitate removable retention of the locking ring 210. An outer surface of the locking ring can comprise hand gripping features 250 that permit the locking ring 210 to be moved to the assembly position 214 and the locked position 218 without the use of tools.

Turning now to FIGS. 7-12, the nozzle assembly connection portion 200 is shown with the locking ring 210 removed. One or more snap windows 246 are provided to correspond to the circumferential location(s) of the guide feature(s) 240 and snap feature(s) 242. The locking ring 210 can be assembled onto the nozzle assembly connection portion 200 by aligning the guide member(s) 240 with the snap window(s) 246 (corresponding to the assembly position 214) and translating the locking ring 210 onto the spray gun body 3 along the spray axis 101 such that the guide feature(s) 240 pass through the snap window(s) 246. When the locking ring is sufficiently moved into installed position, the one or more snap feature(s) snaps into a snap track 244, thereby holding the locking ring 210 in retained relation on the spray gun body 3, while still allowing for rotation. Also provided is a ring track 211 within which the guide feature(s) 240 can ride as the locking ring 210 is rotated. It can be seen that the snap feature(s) 242 can also rotate within the snap track 244.

Figure 6A:
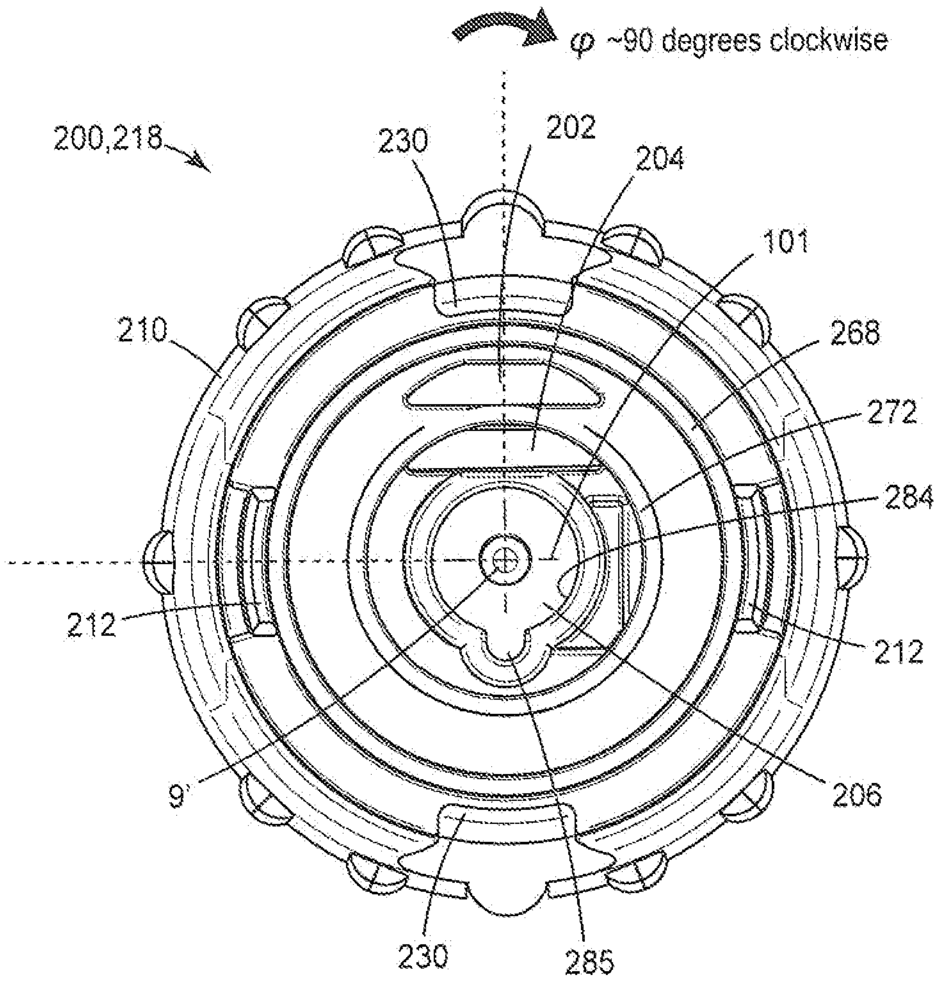
FIG. 6A depicts a nozzle assembly connection portion in a locked position.
Figure 7:
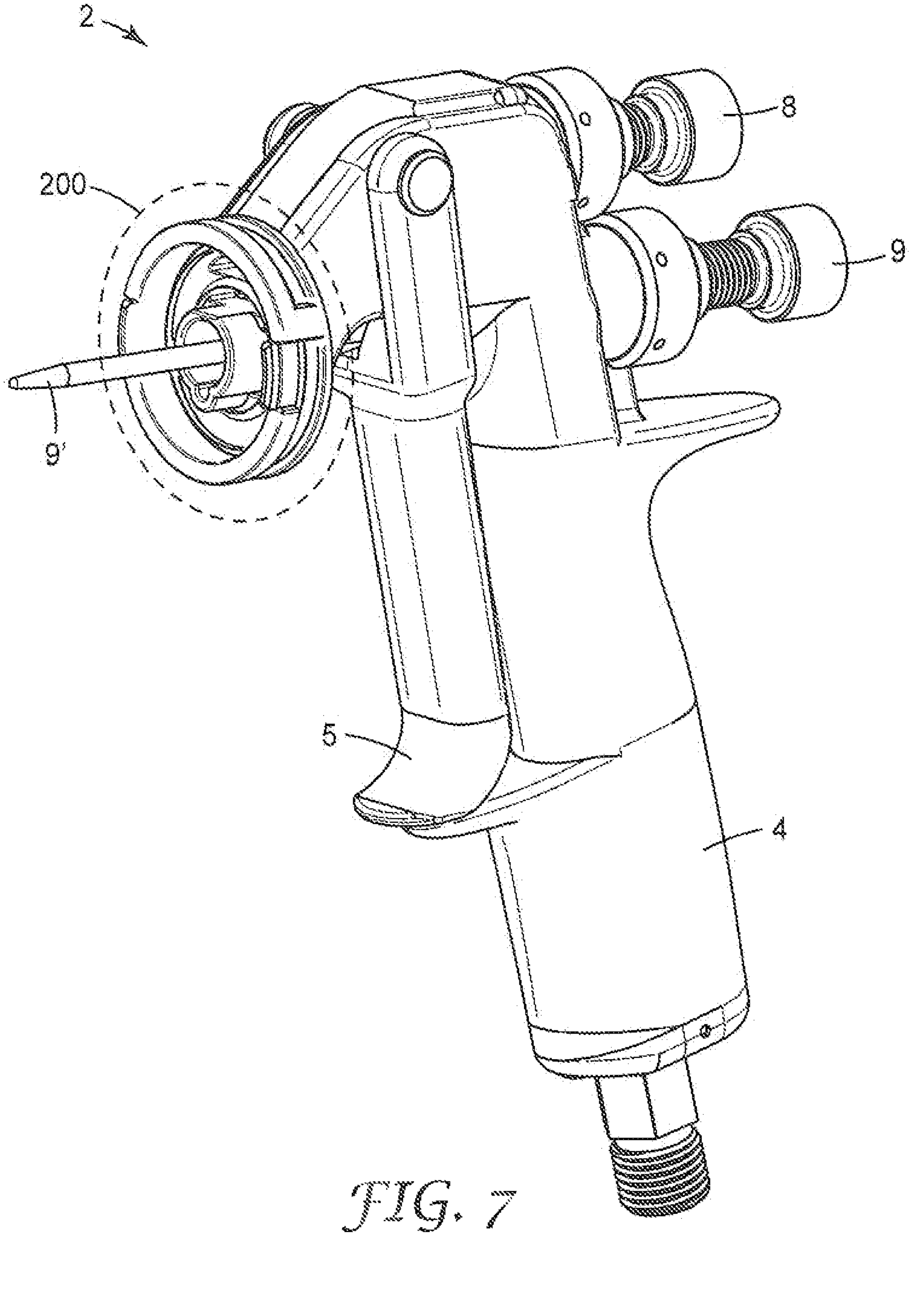
FIGS. 7-12 depict exemplary liquid spray guns wherein a liquid spray gun nozzle assembly and locking ring have been removed.
Figure 8:
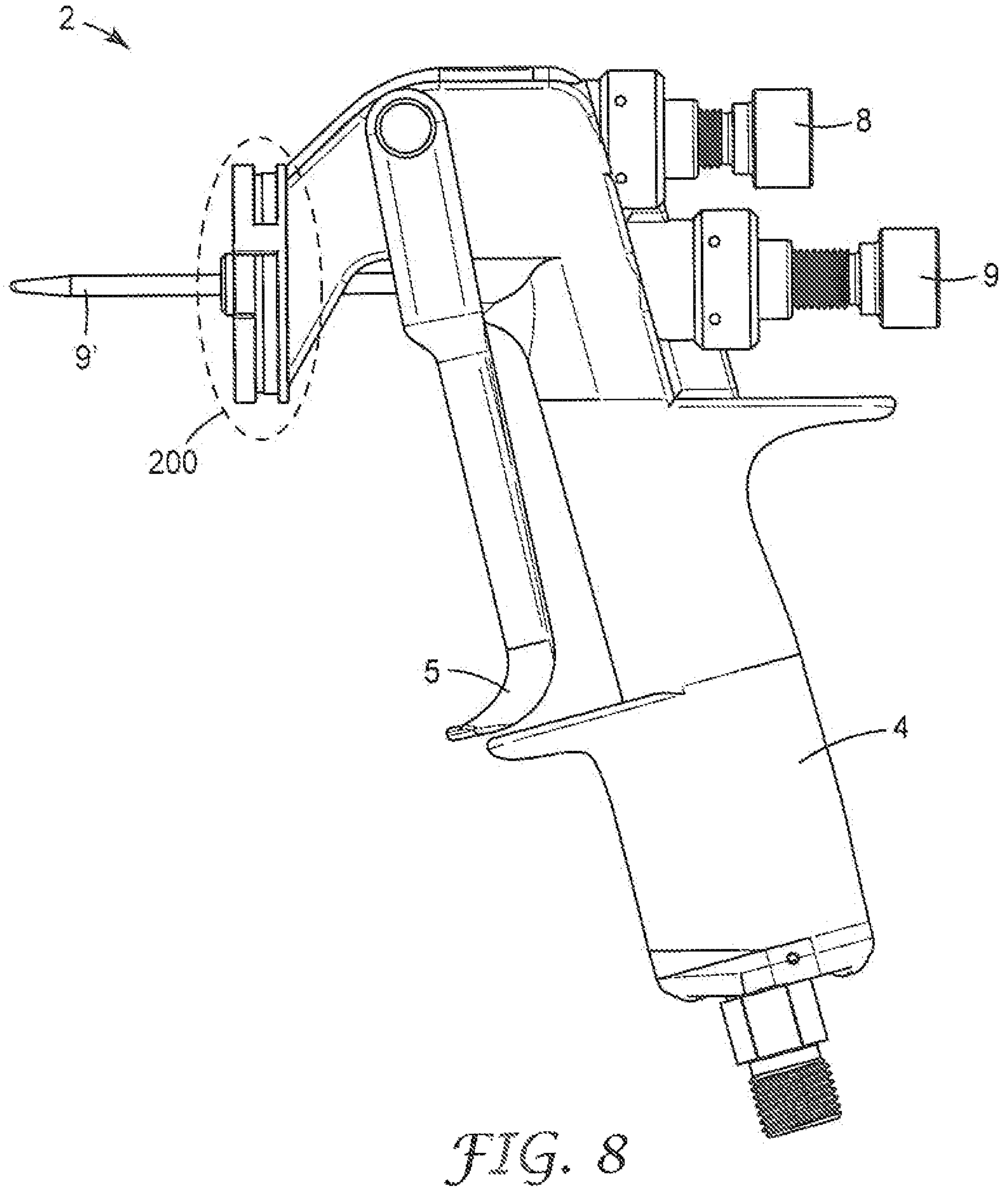
Figure 9:
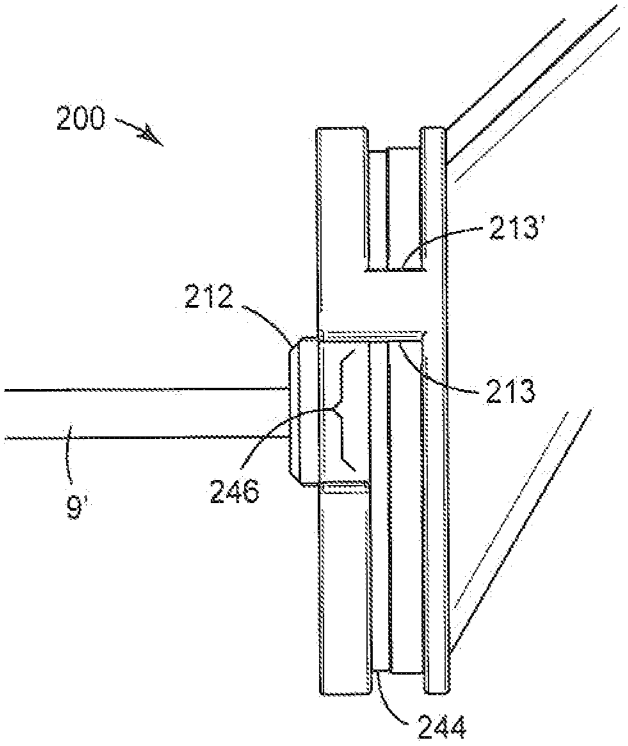
Figure 10:
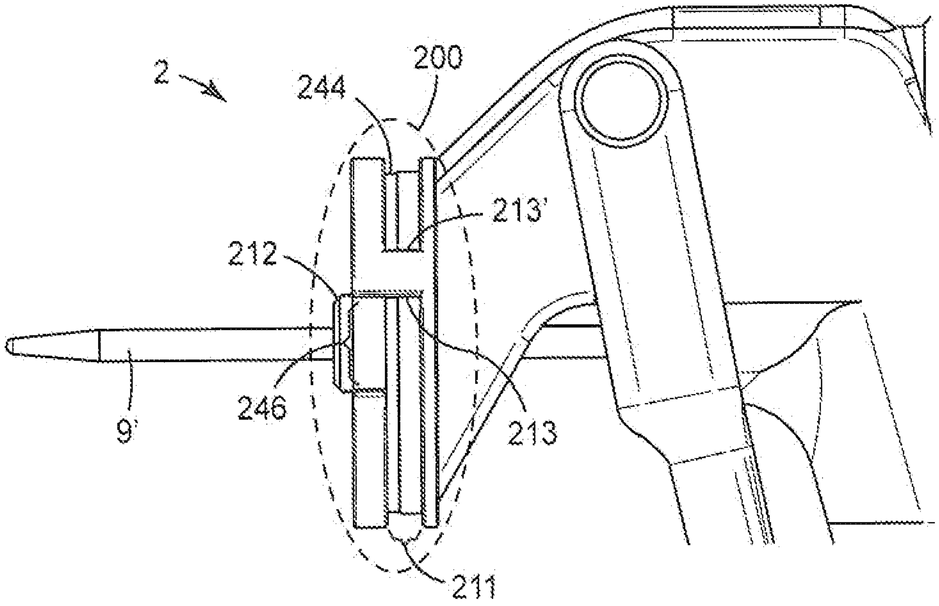
Figure 11:
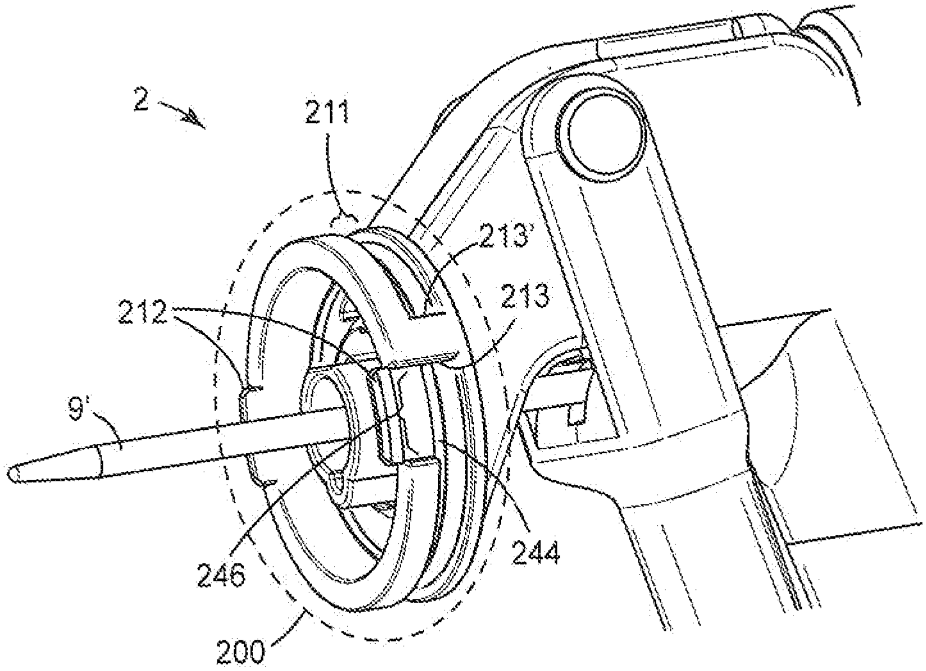
Figure 12:
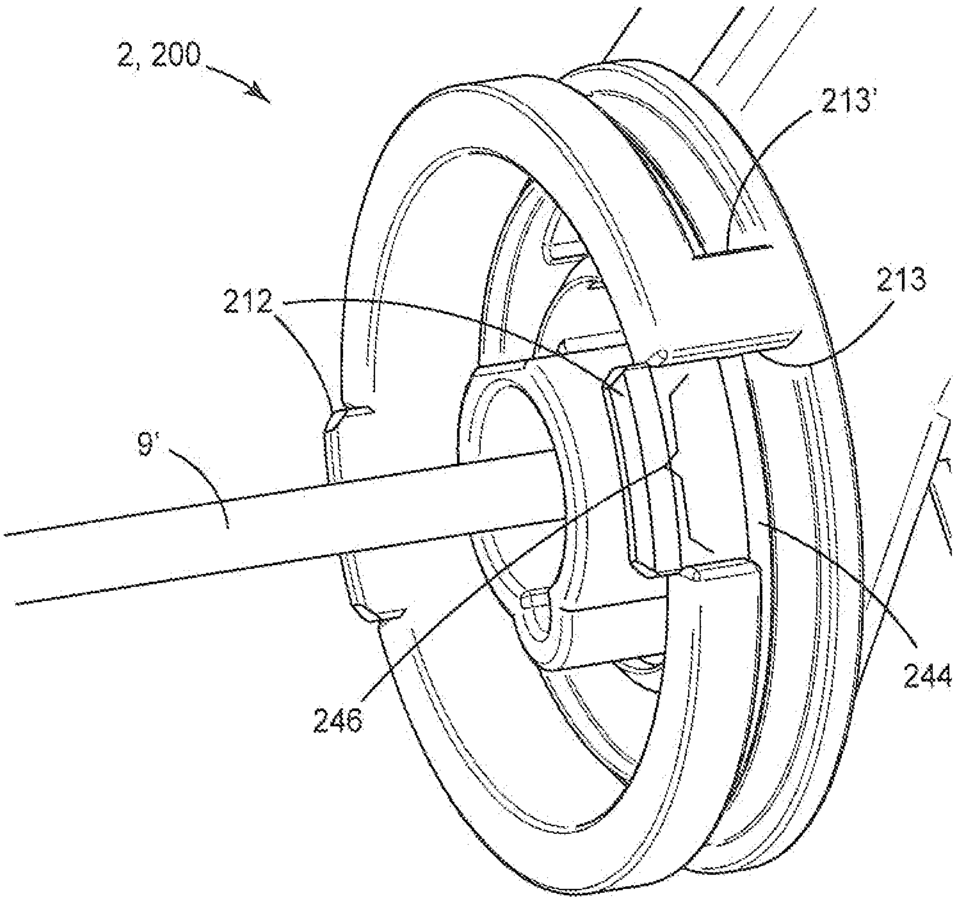
Figure 14:
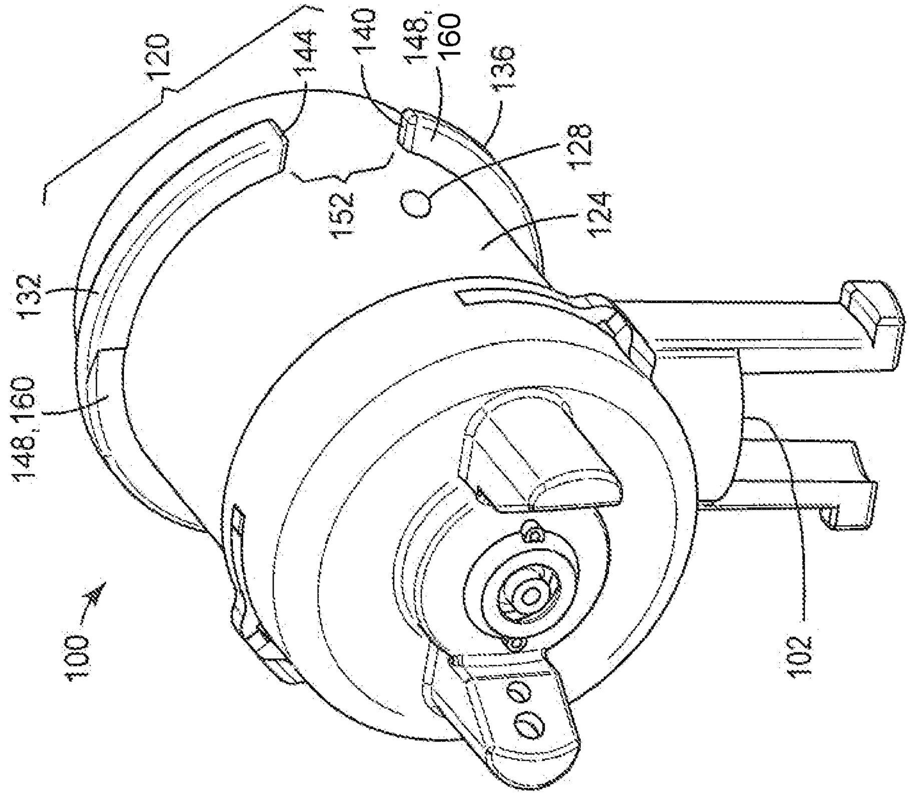
FIGS. 13-16 depict exemplary spray gun nozzle assemblies according to the present disclosure.

In the embodiments shown, when viewing the nozzle assembly connection portion along the spray axis 101 as shown in FIGS. 6 and 6A, the locking ring can then be rotated in the clockwise direction until the guide feature(s) 240 contact a distal ring rotation stop 213'. Conversely, the locking ring 210 can be rotated in the counterclockwise direction until the guide feature(s) 240 contact a proximal ring rotation stop 213 (corresponding again to the assembly position 214).

When the locking ring is in the assembly position 214, it is possible to remove the locking ring 210 from the spray gun body 3 by pulling outwardly along the spray axis 101, thereby disengaging the snap feature(s) 242 from the snap track 244 and permitting the guide feature(s) to be translated outwardly through the snap window(s) 246. In this way, the locking ring can be easily removed without the use of tools for cleaning or replacement should this become necessary. Herein lies an advantage of the disclosed system, whereby moving parts that could become contaminated with coating liquid over time can be easily accessed for cleaning or replacement. The locking ring 210 can be advantageously provided as a disposable part if desired, thereby minimizing replacement cost. Furthermore, the locking ring 210 can be constructed of a resilient material (such as an injection molded polymer) not only to reduce cost but also to provide the necessary resilience needed to perform the snapping functions as described herein (i.e., permitting the snap feature(s) 242 to move slightly to snap into and out of the snap track 244.

In an alternative embodiment, installation and/or removal of the locking ring 210 can take place in a position other than the assembly position. For example, in some embodiments the locking ring is further rotatable to a locking ring removal position that is distinct from the assembly position mentioned above. In one such embodiment, rotation from the assembly position through (and therefore past) the locked position can bring the locking ring to the locking ring removal position. This position cannot ordinarily be reached while the liquid spray gun nozzle assembly is installed due stoppage of rotation of the locking ring by interference with the camming members (i.e., because the locking ring will not then turn beyond a locking state). As a result, in such an embodiment there is no possibility of removing the locking ring while the liquid spray gun nozzle assembly is installed.

Turning now to FIGS. 13-17, the spray gun connection portion 120 of the liquid spray gun nozzle assembly 100 is further described. The spray gun connection portion 120 comprises an outer wall 124 comprising a radially-outward facing surface 128. The radially-outward facing surface 128 comprises at least a first camming member 132. In the embodiments shown, the radially-outward facing surface 128 comprises a second camming member 136. Each camming member (132, 136) comprises a camming surface 148. In the embodiments shown, the camming surface(s) 148 face generally axially away from the spray gun connection portion 120 (i.e., away from the nozzle assembly connection portion 200 on the spray gun body 3 when the liquid spray gun nozzle assembly is installed thereon). One or both of the respective camming surface(s) 148 (and/or the lug camming surface(s) 232 on the locking ring 210) comprises an inclined portion 160 to facilitate a camming interaction.

Figure 15:
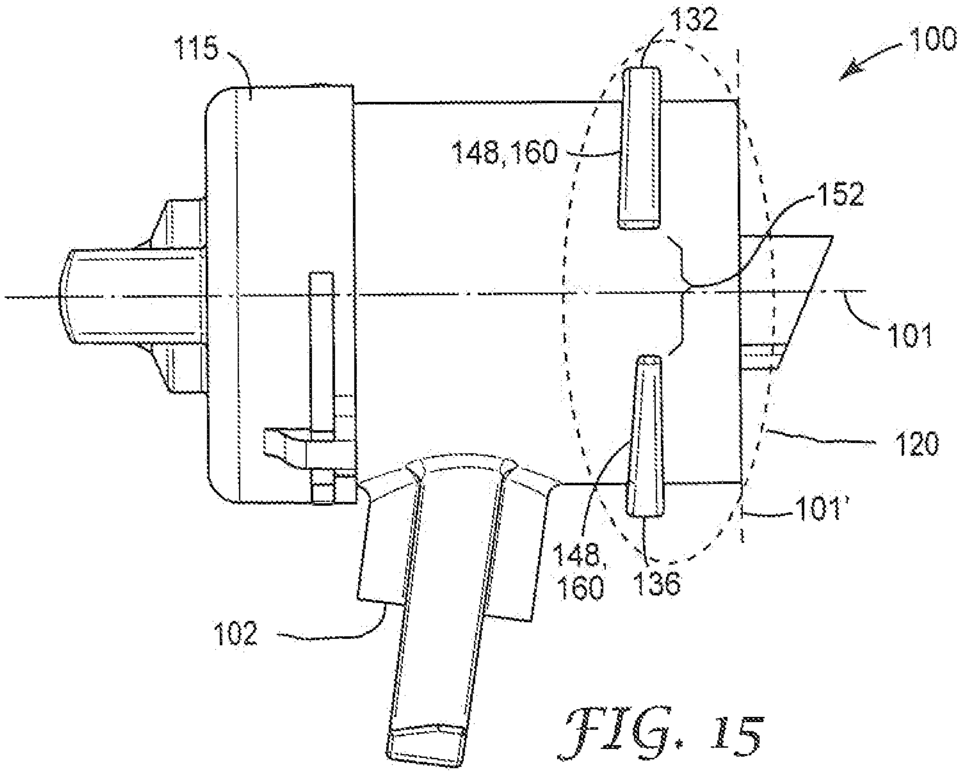
Figure 16:
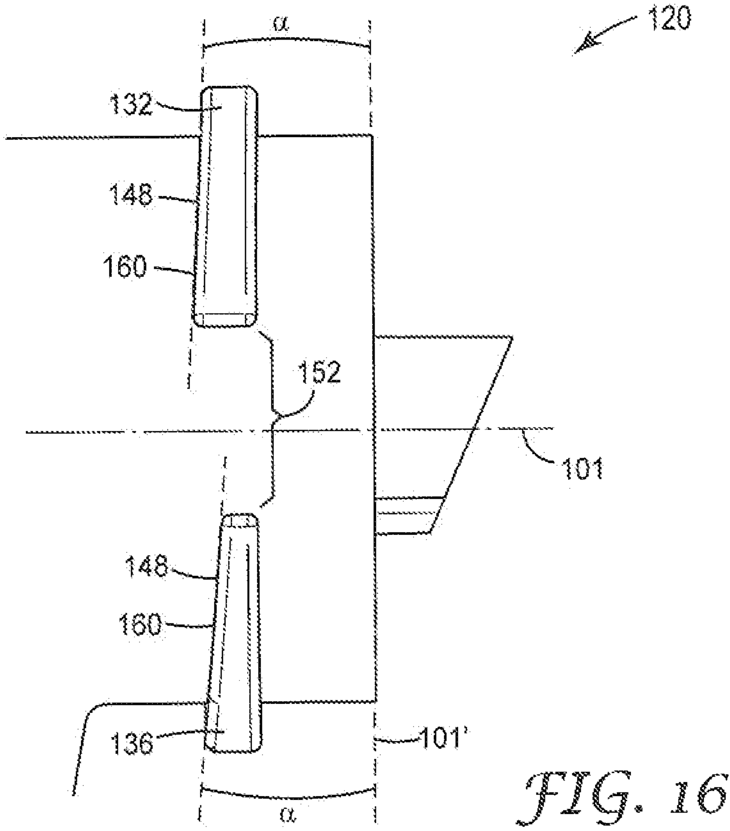

As shown in FIGS. 15 and 16, a base plane 101' is defined perpendicular to the spray axis 101. It can be seen that the inclined portion(s) 160 comprise a portion that is inclined relative to the base plane 101' at an angle $\alpha$. Although the inclined portion(s) 160 are shown as flat surfaces (i.e., a linear incline, such that the entire inclined surface(s) 160 are inclined at the angle $\alpha$), it is also possible to provide the inclined surface(s) 160 as curved or other non-flat (i.e., non-linear) surfaces such that only a portion of the inclined surface(s) 160 are provided at the angle $\alpha$. The angle $\alpha$ is chosen to provide sufficient camming action to securely draw the liquid spray gun nozzle assembly 100 toward the spray gun body 3 while allowing for sufficient angular rotation of the locking ring 210 about an angle $\phi$ when travelling from the assembly position 214 to the locked position 218 (see, e.g., FIGS. 6 and 6A). In some embodiments, the angle $\alpha$ is in a range from about 2 degrees to about 10 degrees, including, for example, 3, 4, 5, 6, 7, 8, or 9 degrees. In some embodiments, the angle $\phi$ is in a range from about 15 degrees to about 180 degrees, including, for example, 20, 30, 40, 50, 60, 70, 80, 90, 100, 11, 120, 130, 135, 140, 150, or 160 degrees. In some embodiments, the angle $\phi$ is in a range from about 45 degrees to about 140 degrees. In one embodiment, the angle $\alpha$ is about 5 degrees, while the angle $\phi$ is about 90 degrees (as shown rotated 90 degrees in the clockwise direction in FIG. 6A). In another embodiment, the angle $\alpha$ is about 5 degrees, while the angle $\phi$ is about 135 degrees. It should be understood that, for any given configuration, locking contact may occur at slightly varying angles $\phi$ depending on the angle $\alpha$, the interaction between the camming lug(s) 230 and the camming member(s) 132, and the tolerances of the cooperating parts.

Each camming member (132, 136) comprises a camming member first end 140 and a camming member second end 144. An access window (152, 156) is located circumferentially between a camming member second end 144 and a camming member first end 140. In the embodiments shown, a first camming member 132 and second camming member 136 are provided, thereby providing a first access window 152 and a second access window 156.

Turing back now to FIGS. 7-12, the nozzle assembly connection portion may be further provided with one or more nozzle keys 212. The nozzle key(s) align with the first and/or second access window(s) (152, 156) on the liquid spray gun nozzle assembly 100 to prevent rotation of the liquid spray gun nozzle assembly 100 relative to the spray gun body 3. In the embodiments shown the nozzle key(s) 212 fits snugly between a camming surface first end 140 and a camming surface second end 144. In this way, the liquid spray gun nozzle assembly 100 is held in a rotationally fixed manner while the locking ring 210 is rotated to the assembly position 214 and the locked position 218. The nozzle key(s)

212 in cooperation with the first and/or second access window(s) (152, 156) further provide helpful alignment to insure that the spray gun nozzle assembly 100 is correctly rotationally positioned for installation onto the nozzle assembly connection portion 200 of the spray gun body 3.

The locking ring 210 is rotatable to an assembly position 214 (see FIG. 6) and a locking position 218 (see FIG. 6A). In the embodiments shown, in the assembly position 214, one or more camming lugs 230 are positioned such that they correspond in position to the one or more nozzle keys 212. The first and/or second access windows (152, 156) are then positioned adjacent to the one or more camming lugs 230 and nozzle keys 212. The one or more camming lugs 230 and nozzle keys 212 are then passed through the first and/or second access windows by translating the spray gun nozzle assembly toward the nozzle assembly connection portion 200.

Then, upon proper location of the spray gun nozzle assembly 100 against the nozzle assembly connection portion 200 (while the locking ring 210 is in the assembly position 214), the locking ring 210 can be rotated into the locked position 218 to securely retain the spray gun nozzle assembly 100 thereon. During rotation of the locking ring 210 from the assembly position 214 to the locked position 218, the lug camming surface(s) 232 engage the camming surface(s) 148 on the spray gun nozzle assembly, thereby interacting with the inclined portion(s) 160 to pull the spray gun nozzle assembly 100 axially (along the spray axis 101) toward the spray gun body 3. Meanwhile, the one or more nozzle keys 212 retain the spray gun nozzle assembly in rotational position with respect to the nozzle assembly connection portion 200. The locking ring 210 is rotated from the assembly position 214 with manual rotational force (i.e., by hand) until sufficient axial force is generated to create a sufficient operational seal between the various sealing members and sealing seats described elsewhere herein. This is the locked position. Sufficient friction is created by interaction of the lug camming surface(s) 232 and the camming surface(s) 148 to retain the locking ring in the locked position 218 until the user wishes to remove the spray gun nozzle assembly.

For removal, the user rotates the locking ring 210 into the assembly position, thereby again aligning the one or more camming lugs 230 with the first and/or second access windows (152, 156). The spray gun nozzle assembly 100 can then be pulled away from the nozzle assembly connection portion 200, thereby passing the one or more camming lugs 230 through the first and/or second access windows (152, 156) to separate the components.

Provision of a locking ring 210 and corresponding features as shown and described herein can allow for secure, easy, tool-free assembly and removal of a spray gun nozzle assembly 100 from a spray gun body 3. The embodiments shown and described can also provide for easy removal, cleaning, and cost-effective replacement (if necessary) of the locking ring 210.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A liquid spray gun nozzle assembly comprising:

a coating liquid inlet portion comprising a liquid connector for connection to an external liquid source;

a coating liquid outlet portion comprising a liquid nozzle for spraying a coating liquid fed into the nozzle assembly through the coating liquid inlet portion, the liquid nozzle being disposed along a spray axis;

a coating liquid flow path fluidly connecting the coating liquid inlet portion to the liquid nozzle;

a spray gun connection portion opposite the coating liquid outlet portion adapted to connect the liquid spray gun nozzle assembly to a compatible liquid spray gun body, the spray gun connection portion comprising:

a liquid sealing member configured to facilitate provision of a liquid needle within a liquid needle zone;

an air sealing member configured to isolate an air zone, wherein the air sealing member comprises a tapering rim terminating at an apex;

wherein the liquid sealing member and the air sealing member are circular in shape.

2. The spray gun nozzle assembly of claim 1, wherein, upon connection to the compatible liquid spray gun body, the liquid needle is isolated within the liquid sealing member.

3. The spray gun nozzle assembly of claim 1, wherein the tapering rim terminates in a pointed profile.

4. The spray gun nozzle assembly of claim 3, wherein the pointed profile digs into a sealing seat of the compatible liquid spray gun body.

5. The spray gun nozzle assembly of claim 1, wherein the liquid sealing member and air sealing member form a center air zone.

6. The spray gun nozzle assembly of claim 1, wherein the liquid sealing member and air sealing member form a shaping air zone between a wall of the liquid sealing member and a wall of the air sealing member.

7. The spray gun nozzle assembly of claim 1, further comprising a second air sealing member, wherein the second air sealing member comprises a tapering rim, wherein the second air sealing member and air sealing member form a shaping air zone.

8. The spray gun nozzle assembly of claim 1, wherein the liquid sealing member and air sealing member are concentric.

9. A liquid spray gun assembly comprising:

the liquid spray gun nozzle assembly of claim 1; and the compatible liquid spray gun body that is compatible with the liquid spray gun nozzle assembly.

10. The liquid spray gun assembly of claim 9, further comprising a captured rotatable locking ring for connection of the compatible liquid spray gun nozzle assembly to the liquid spray gun body.

11. The liquid spray gun assembly of claim 9, wherein the compatible liquid spray gun body comprises a sealing seat configured to interact with the liquid sealing member, wherein the sealing seat and the liquid sealing member provide a sealing function by way of a resiliently compressible material.

12. The liquid spray gun assembly of claim 11, wherein the resiliently compressible material further comprises a gasket, wherein the gasket is insert molded in the compatible liquid spray gun body.

13. The liquid spray gun assembly of claim 9, wherein the compatible liquid spray gun body comprises a nozzle key configured to align with a first access window formed between two camming members to prevent rotation of the liquid spray gun nozzle assembly relative to the compatible liquid spray gun body.

14. A method of using the liquid spray gun assembly of claim 9, comprising installing the liquid spray gun nozzle assembly onto the compatible liquid spray gun body.

15. A liquid spray gun assembly comprising:

a liquid spray gun nozzle assembly comprising:

a coating liquid inlet portion comprising a liquid connector for connection to an external liquid source;

a coating liquid outlet portion comprising a liquid nozzle for spraying a coating liquid fed into the nozzle assembly through the coating liquid inlet portion, the liquid nozzle being disposed along a spray axis;

a coating liquid flow path fluidly connecting the coating liquid inlet portion to the liquid nozzle;

a spray gun connection portion opposite the coating liquid outlet portion adapted to connect the liquid spray gun nozzle assembly to a compatible liquid spray gun body;

wherein the spray gun connection portion comprises:

a liquid sealing member configured to facilitate provision of a liquid needle within a liquid needle zone; and an air sealing member configured to isolate an air zone, wherein the air sealing member comprises a tapering rim terminating at an apex;

wherein the liquid sealing member and the air sealing member are circular in shape; and the compatible liquid spray gun body comprising a sealing seat compatible with the air sealing member.

16. The liquid spray gun assembly of claim 15, wherein the tapering rim terminates in a pointed profile.

17. The liquid spray gun assembly of claim 16, wherein the pointed profile digs into the sealing seat.

18. The liquid spray gun assembly of claim 15, wherein the liquid sealing member and air sealing member are concentric.

19. The liquid spray gun assembly of claim 15, wherein the sealing seat is provided as a blind recessed receiving port.

20. The spray gun nozzle assembly of claim 1, wherein a sidewall forming the air sealing member is thicker at a proximal end than at a distal end of the tapering rim.

* * * * *